United States Patent
Gu et al.

(10) Patent No.: US 11,070,130 B2
(45) Date of Patent: Jul. 20, 2021

(54) SYSTEM AND METHOD FOR RESONANT BUCK REGULATOR

(71) Applicant: Northwestern University, Evanston, IL (US)

(72) Inventors: Jie Gu, Evanston, IL (US); Tianyu Jia, Evanston, IL (US)

(73) Assignee: Northwestern University, Evanston, IL (US)

( * ) Notice: Subject to any disclaimer, the term of this patent is extended or adjusted under 35 U.S.C. 154(b) by 2 days.

(21) Appl. No.: 15/993,785

(22) Filed: May 31, 2018

(65) Prior Publication Data

US 2018/0351456 A1 Dec. 6, 2018

Related U.S. Application Data

(60) Provisional application No. 62/513,751, filed on Jun. 1, 2017.

(51) Int. Cl.
*H02M 3/157* (2006.01)
*H02M 1/08* (2006.01)
*H02M 3/158* (2006.01)
*H02M 3/156* (2006.01)
*H02M 1/00* (2006.01)

(52) U.S. Cl.
CPC ............. *H02M 3/157* (2013.01); *H02M 1/08* (2013.01); *H02M 3/156* (2013.01); *H02M 3/158* (2013.01); *H02M 3/1588* (2013.01); *H02M 2001/0029* (2013.01); *H02M 2001/0054* (2013.01); *H02M 2001/0058* (2013.01)

(58) Field of Classification Search
CPC ........ H02M 3/157; H02M 3/158; H02M 1/08; H02M 3/156; H02M 3/1588; H02M 2001/0054; H02M 2001/0058; H02M 2001/0029
See application file for complete search history.

(56) References Cited

U.S. PATENT DOCUMENTS

| | | | |
|---|---|---|---|
| 2003/0142513 A1* | 7/2003 | Vinciarelli | H02M 3/33592 363/17 |
| 2005/0168205 A1* | 8/2005 | Dwarakanath | H02M 3/157 323/283 |
| 2009/0066157 A1* | 3/2009 | Tarng | H03B 5/1228 307/31 |
| 2009/0152949 A1* | 6/2009 | Adragna | H02J 1/102 307/31 |
| 2011/0205761 A1* | 8/2011 | Tschirhart | H02M 3/3376 363/21.02 |
| 2013/0147445 A1* | 6/2013 | Levesque | H03F 3/195 323/271 |
| 2013/0307616 A1* | 11/2013 | Berchtold | H03F 1/0227 330/127 |
| 2016/0359481 A1* | 12/2016 | Leong | H03K 17/163 |

(Continued)

*Primary Examiner* — Fred E Finch, III
*Assistant Examiner* — Kevin H Sprenger
(74) *Attorney, Agent, or Firm* — Benesch, Friedlander, Coplan & Aronoff LLP

(57) ABSTRACT

The systems and methods describe a buck regulator, on-chip inductor and/or power management circuits. A buck regulator circuit can include a first switch and a second switch connected with a resonant switching circuit. The resonant switching circuit includes an inductor, a first capacitor and a second capacitor configured to reduce a switching power from a switching frequency of the buck regulator.

16 Claims, 12 Drawing Sheets

(56) References Cited

U.S. PATENT DOCUMENTS

| | | | |
|---|---|---|---|
| 2017/0212399 A1* | 7/2017 | Tarng | H01L 31/0488 |
| 2017/0250665 A1* | 8/2017 | Randall | H03G 7/002 |
| 2020/0106403 A1* | 4/2020 | Soliman | H03L 7/083 |

* cited by examiner

Tuning $V_{bias}$ to adjust the duty cycle of Vsw:

Dash line: with larger $V_{bias}$

Tuning $I_{ref}$ to adjust the slew rate of Vsw:

Dash line: with larger $I_{ref}$

| | JSSC 2012 | VLSI 2014 | SSCC 2017 | ISSC 2014 | INTEGRATED |
|---|---|---|---|---|---|
| Regulator Type | Buck | Buck | Buck | Switched Capacitor (SC) | Buck |
| Process | 130nm | 22nm | 14nm | 22nm | 65nm |
| Inductor / Capacitor | On-chip inductor | On-chip inductor | On-chip inductor | MIM capacitor | On-chip inductor |
| Fsw (MHz) | 50-250 | 500 | 100 | 250 | 2000 |
| Load Current (mA) | 250 | 250 | 90-330 | 88 | 10-50 |
| L (nH) | 4 | 1.5 | 1.5 | - | 3.4 |
| $C_L$ (nF) | 10 | 10 | 5 | 0.1 | 0.12 |
| Vin (V) | 2.4 | 1.5 | 1.5 | 1.23 | 1.2 |
| Vout (V) | 0.4-1.4 | 0.4-1.2 | 0.4-1.15 | 0.45-1 | 0.35-0.82 |
| Ripple (mV) | >50 | 10 | >50 | 43 | 38 |
| Settling Time (ns) | 20 | 100 | 700 | 3-5 | 20 |
| Peak Efficiency (%) | 77 | 68 | 84 | ~73 (SC) | 71.4 |
| Efficiency @0.6V (%) | ~50 | 58 | <50 | 65 | 63 |
| Area (mm²) | 1.5 | 1.5 | ~0.4 | 0.1 | 0.079 |

FIG. 19

SYSTEM AND METHOD FOR RESONANT BUCK REGULATOR

CROSS-REFERENCE TO RELATED APPLICATIONS

This patent application claims the benefit of U.S. Provisional Patent Application No. 62/513,751, filed on Jun. 1, 2017, the entire contents of which is incorporated by reference in its entirety.

STATEMENT OF FEDERALLY FUNDED RESEARCH OR SPONSORSHIP

This invention was made with government support under CCF1618065 awarded by the National Science Foundation. The government has certain rights in the invention.

BACKGROUND

Voltage regulators are designed to automatically maintain a constant voltage level. A voltage regulator may use an electromechanical mechanism, or electronic components. Depending on the design, the voltage regulator may be used to regulate one or more AC or DC voltages. Electronic voltage regulators are found in devices such as computer power supplies where they stabilize the DC voltages used by the processor, e.g., central processing unit (CPU), and other elements. Conventionally, discrete voltage regulators and associated inductor components are deployed separately from main computing processors on an electronic board.

BRIEF DESCRIPTION OF DRAWINGS

FIG. 19 is a chart comparing example fully integrated converters.

DETAILED DESCRIPTION

The systems and methods describe a buck regulator, on-chip inductor and power management circuits. Ultra-low power electronics with small form factors and low manufacturing cost can be used in various products, including but not limited to, mobile devices, wearable devices, the Internet-of-Things applications, etc. Voltage regulators can provide stable voltage, e.g., at very low voltage (about 0.3V to 1V) and low current condition for integrated circuits (IC). To reduce a cost and/or size of the electronics, a switching regulator is described, e.g., a buck regulator, which can be integrated on existing IC chips, e.g., microprocessors, using on-chip inductor and switching regulators, e.g., on a same chip of a main processor or controller. To overcome large current requirements from the inductor to generate sufficient voltage drop, the buck regulator can include an ultra-high switching frequency, e.g., 4 to 10 times higher than existing demonstrations, leading to e.g., a 10 to 100 times smaller size inductors.

Additionally or alternatively, resonant switching techniques are described to reduce a switching power from the switching frequency of the buck regulator, providing an efficient fully integrated buck regulator design. Resonant switching techniques can include (1) forming a resonant tank with on-chip inductor and on-chip capacitor, and (2) reusing the resonant tank as part of a voltage-controlled oscillator (VCO) circuit which provides an on-chip high frequency clock. The first technique includes an external clock while the second technique does not, which can further reduce costs. For both techniques, example control systems are also described to establish a feedback control for voltage regulation. Example slew rate recovery circuits are also described to help further improve the power convention efficiency of the design.

In some examples, the buck regulator, on-chip inductor and/or power management circuits allows elimination of conventionally used discrete components on the printed circuit board (PCB). Applications include, but are not limited to low power electronics, mobile devices, e.g., phones and smart devices, the Internet-of-Things, remote sensors using integrated circuits, biomedical devices using integrated circuits, power converters, etc. Advantages include, but are not limited to, allowing discrete buck regulator and inductors to be integrated on the same chip as processing units, bringing smaller size, smaller form factor of the electronic system, reducing switching power of conventional buck regulator through a resonant switching technique, etc.

Figure 1A:
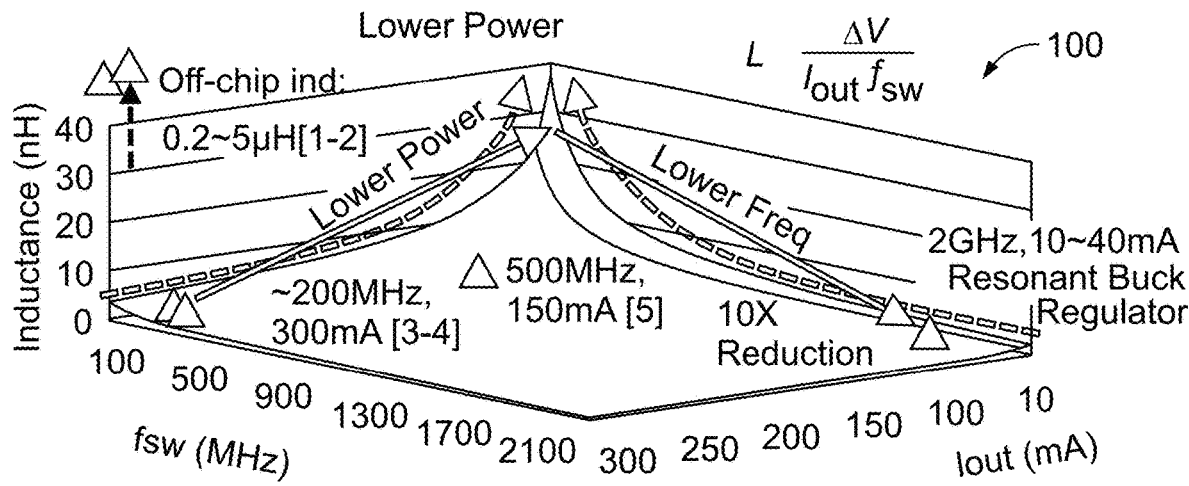
FIG. 1A is a graph of an example inductor versus frequency and load current for a buck regulator.
Figure 1B:
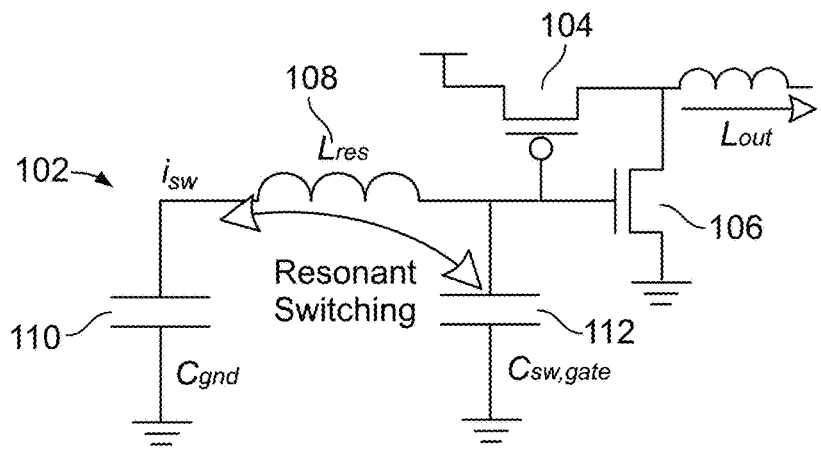
FIG. 1B is a schematic of an example of a resonant switching circuit for the buck regulator.
Figure 1C:
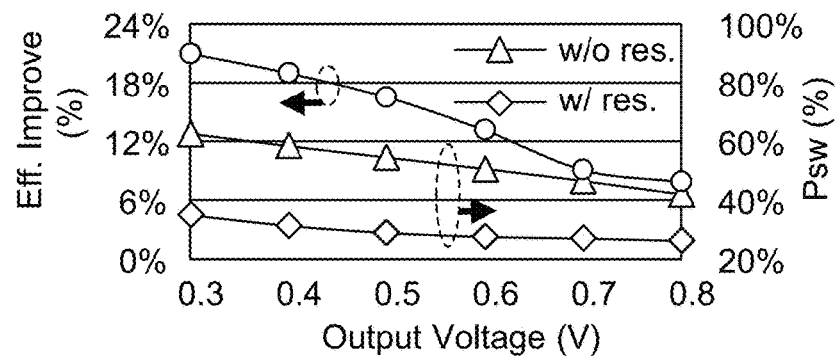
FIG. 1C is a graph of an example efficiency improvement from resonant switching of the buck regulator.

FIG. 1A is a graph 100 of an example inductor versus frequency and load current for buck regulators. FIG. 1B is a schematic of an example of a resonant switching circuit 102 for the buck regulator. FIG. 1C is a graph of an example efficiency improvement from resonant switching of the buck regulator. A buck regulator integrated with the resonant circuitry 102 can provide for ultra-low voltage applications including, but not limited to, (1) an ultra-high switching frequency at 2 GHz or more with small inductor size at low load current and (2) a resonant switching technique rendering significant efficiency improvement. With small on-chip inductors, in one example, a wide voltage tuning range can include about 0.3-0.86V, at 10-40 mA low current, up to 73% efficiency, for example, and only occupy 0.073 mm2 in a 65 nm CMOS process.

Ultra-low voltage operation from near or sub-threshold computing can pose challenges for fully integrated on-chip regulators due to the low load current. Conventional buck converters are normally designed with off-chip inductors or on-chip inductors with high load current at several hundred mA. Based on the equation of step-down voltage $$\Delta V = L \cdot \frac{\partial i}{\partial t} \propto L \cdot f_{sw} \cdot I_{out},$$

at a current condition of only tens of mA, orders of magnitude larger inductor can be needed. FIG. 1A shows a relationship between load current, $f_{sw}$, and inductor values. In some examples, to enable the use of small on-chip inductor, a switching frequency $f_{sw}$ of about 2 GHz can be implemented. As a high switching frequency $f_{sw}$ can cause high switching power loss, a special resonant switching is described to reduce switching power consumption. In FIG. 1B, a resonant network is formed between the main switches 104, 106 and resonant inductor 108, e.g., with capacitors 110, 112, to provide a saving of switching power. FIG. 1C shows example simulation results on switching power contribution as well as efficiency improvement with and without resonant switching. About an 8 to 21% efficiency improvement can be observed using the resonant switching at low voltages from about 0.3V to 0.8V.

Figure 2:
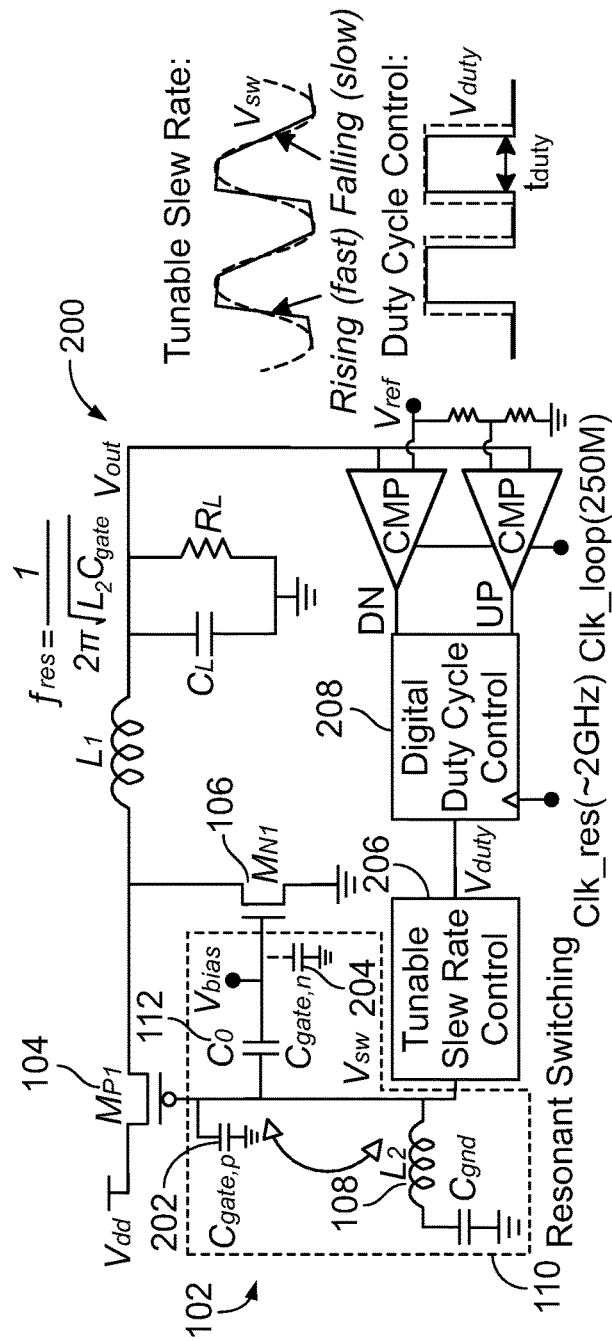
FIG. 2 is an example circuit of the buck regulator with resonant switching scheme.

FIG. 2 is an example circuit of the buck regulator 200 with resonant switching circuit 102 connected with the buck regulator 200. Different from a conventional design, to utilize resonant switching, the PMOS and NMOS power switches 104, 106 are jointly switched through the resonant network 102 where a resonant inductor $L_2$ resonates with the switches' gate capacitance $C_{gate,p}$ 202 and $C_{gate,n}$ 204. Capacitor $C_{gnd}$ 110 provides a self-biasing AC ground, with an example value of 30 pF. The degradation of slew rate from resonant operation leads to large short circuit current and switch conduction power loss. To suppress the short circuit current, NMOS switch 106 can be AC coupled and biased at low voltage near its threshold voltage. To recover slew rate and/or adjust duty cycle, the buck regulator 200 can connect with a tunable slew rate control 206 and digital duty cycle control circuit 208, respectively, as described in more detail below.

Figure 3:
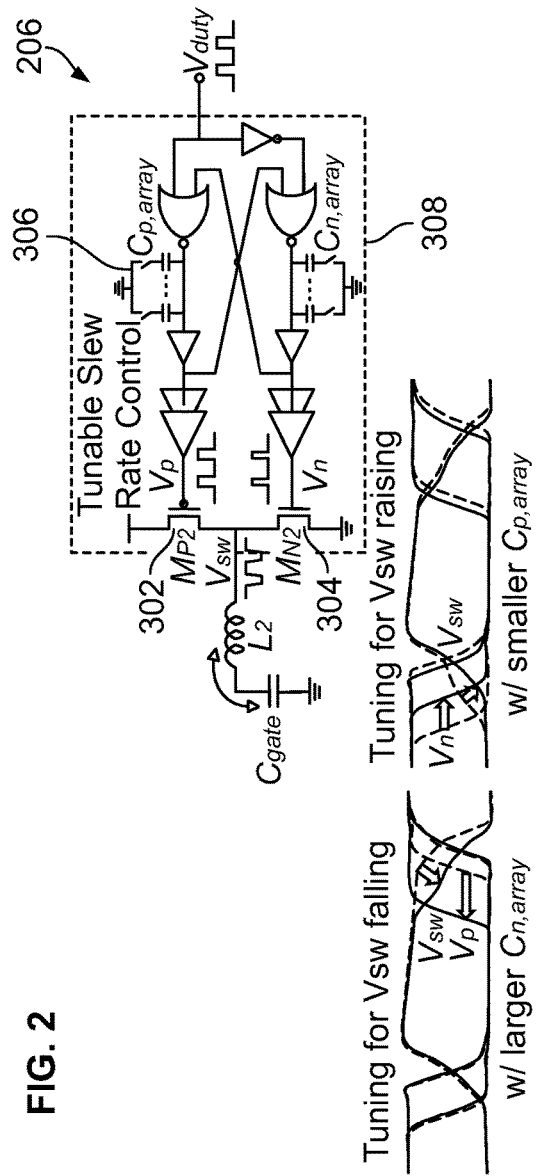
FIG. 3 is a schematic for an example tunable slew rate control block and tuning strategy for the clock rising and falling slew rate.

FIG. 3 is a schematic for an example tunable slew rate control block 206 and tuning method for addressing the clock rising and falling slew rate. To recover slew rate, the switching voltage $V_{sw}$ can be generated by a digital tunable slew rate control block 206. The control of slew rate can be done separately by $V_p$ (voltage controlling PMOS) and $V_n$ (voltage controlling NMOS) by adjusting the timing of clock driver MP2 302 and MN2 304 through the tunable capacitors $C_{n,array}$ 308 and $C_{p,array}$ 306, respectively. Since recovery on slew rate can require extra clock power, a design tradeoff can be implemented. For example, $V_{sw}$ is tuned with fast rising slew rate to reduce high conduction loss through MP1 104 and MN1 106 due to high current flow at rising transition and is tuned with slow falling slew rate to retain resonant energy saving.

Figure 4:
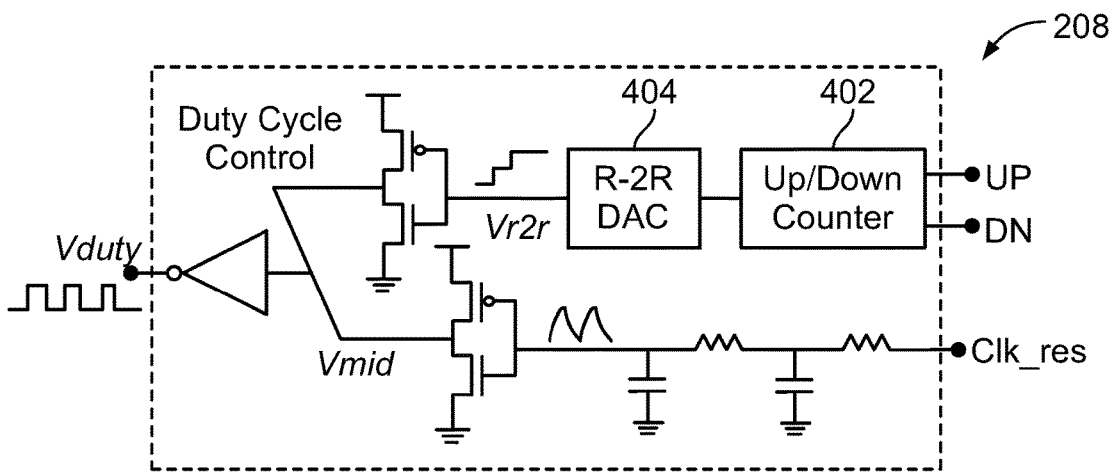
FIG. 4 is a schematic for an example digital duty cycle control block.

FIG. 4 shows a digital duty cycle control circuit 208 which can adjust duty cycle of $V_{sw}$ for different output voltage/current of the buck regulator 200. The duty cycle control can be provide a clocked feedback loop to the buck regulator 200 via the duty cycle control circuit 208, for example at 250 MHz (see also FIG. 2). The comparison results of $V_{out}$ and $V_{ref}$ issues digital control signals from an up/down counter 402 to a digital to analog convertor (DAC) 404, e.g., an R-2R DAC, which changes the trip voltages of digital buffers providing adjustment of the duty cycle between about 18% and 84%. In one example, the main inductance $L_1$ is about 3 nH and the resonant inductance $L_2$ is about 8.2 nH with similar size and smaller Q factor.

Figure 5:
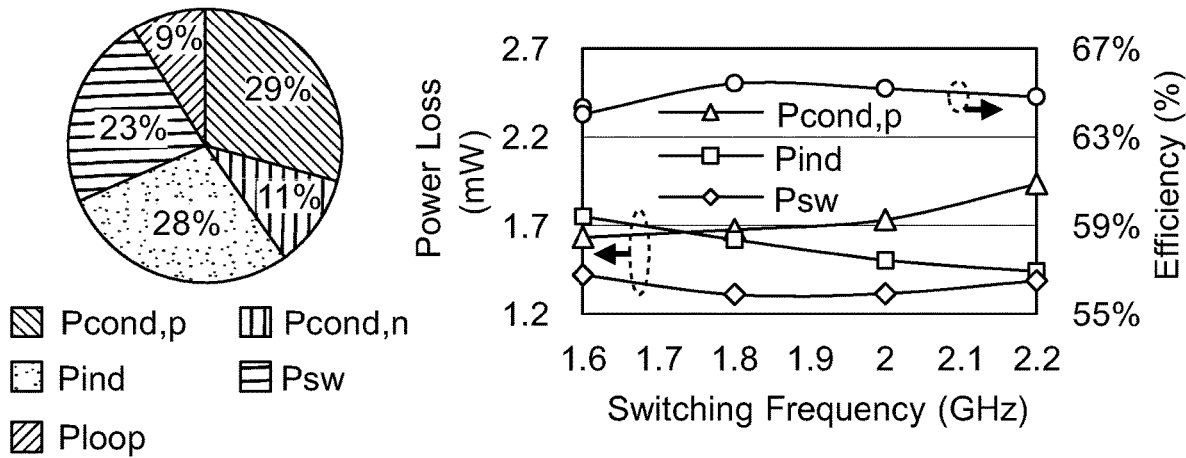
FIG. 5 is an example graph simulation of power loss breakdown at Vout=0.6V and power loss model versus switching frequency fsw.

FIG. 5 is an example graph simulation of power loss breakdown at Vout=0.6V and power loss model versus switching frequency fsw. The power loss breakdown of the buck regulator 200 can be analyzed in FIG. 5, e.g., where $$P_{Loss} = P_{cond,p/n} + P_{ind} + P_{sw} + P_{loop}$$

$$P_{cond,p/n} = I_d^2 R_{on} + \int_0^{transition} i_{ds}v_{ds}dt \cdot f_{sw} \propto f_{sw}, \text{ (for } M_{P1} \text{ \& } M_{N1})$$

$$P_{ind} = I_{out}^2 R_{ind} = (\Delta V/(4Lf_{sw}))^2 R_{ind} \propto 1/f_{sw}^2, \text{ (for Inductor } L_1)$$

$$P_{sw} = a\frac{\pi}{4Q}C_{gate}V_{dd}^2 \cdot f_{sw} + P_{clk} \propto f_{sw}, \text{ (for } C_{gate} \text{ and clock power)}$$

Figure 6:
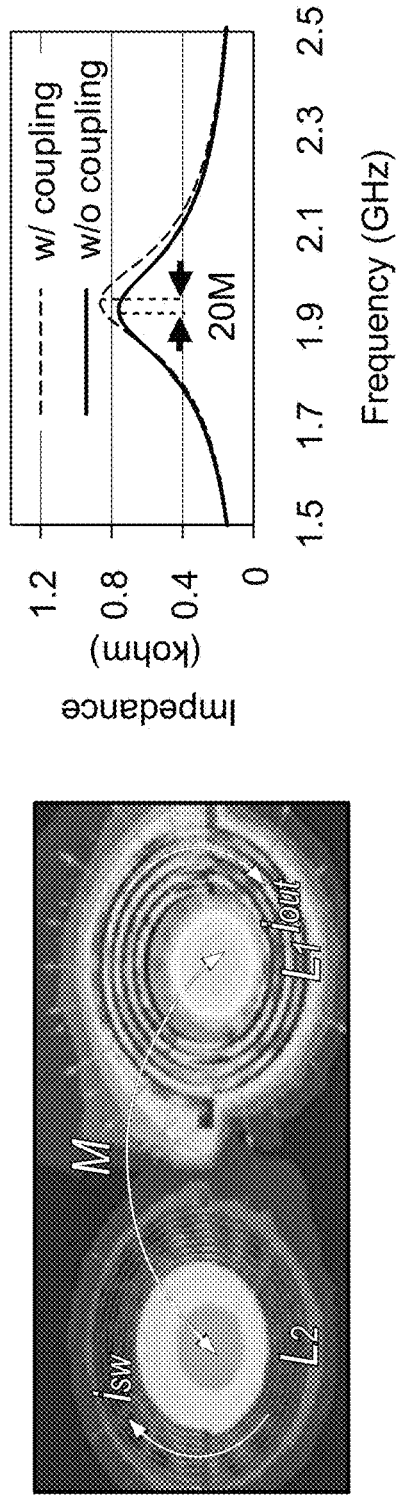
FIG. 6 is a graph of an example simulation of inductor mutual coupling.

An optimal $f_{sw}$ is observed at the balance of switch conduction loss (increase with $f_{sw}$) and inductor loss (decrease with $f_{sw}$). Because $L_1$ carries>10× more current than $L_2$ and resides in a close vicinity, the mutual coupling effects are studied to avoid noise injection into switching transistors. EM simulation in FIG. 6 shows 20 MHz resonant frequency shift due to mutual inductance and the overall coupling from $L_1$ to $L_2$ is less than −40 dB, where $$L_{eff,1} = L_1 + M\frac{\partial i_{sw}/\partial t}{\partial i_{out}/\partial t} \approx L_1 \quad L_{eff,2} = M\frac{\partial i_{out}/\partial t}{\partial i_{sw}/\partial t} \quad i_{out} \gg i_{sw}$$

Example Measurement Results

Figure 7:
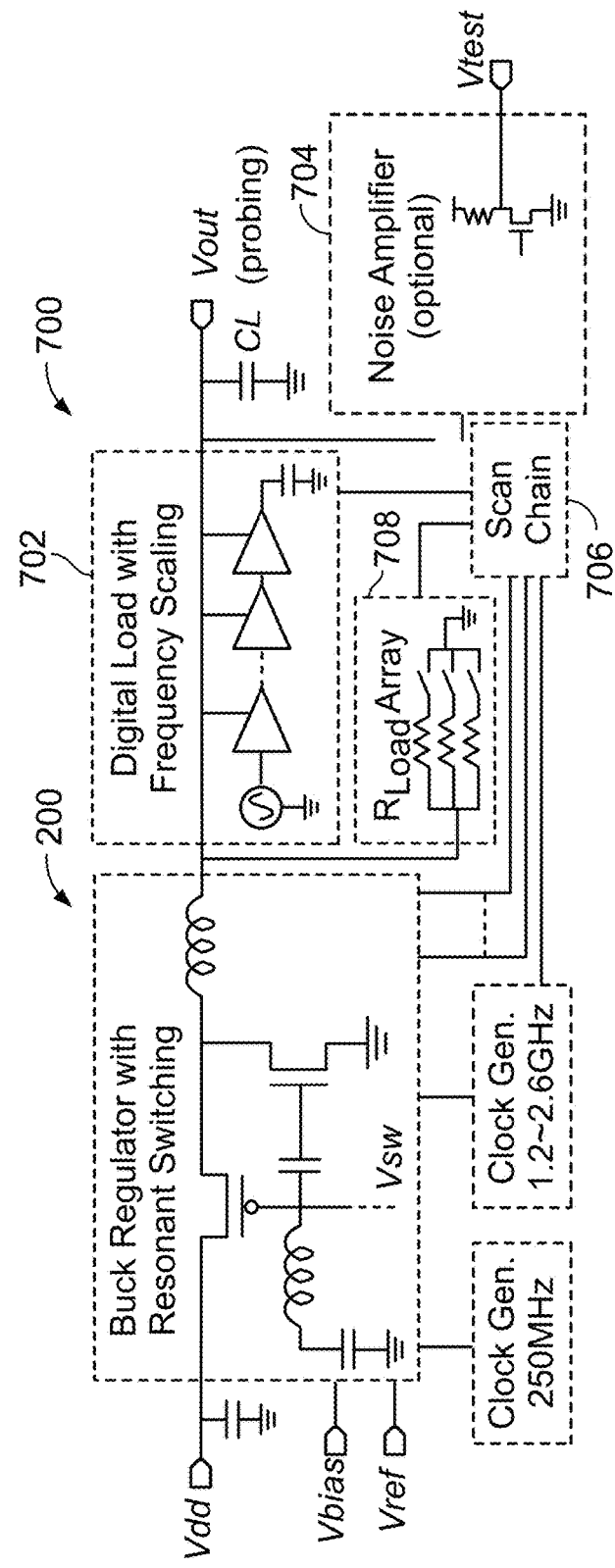
FIG. 7 is a schematic of an example test chip.

The buck regulator can be fabricated in 65 nm CMOS process with 1.1V input voltage. Other processes can be used. FIG. 7 shows example test chip configurations 700, which also include a digital logic load circuit 702 that can operate under dynamic frequency scaling (DFS). The test chip configuration 700 can include an optional noise amplifier 704, scan chain 706 and load resistor array 708 for testing the chips.

Figure 8:
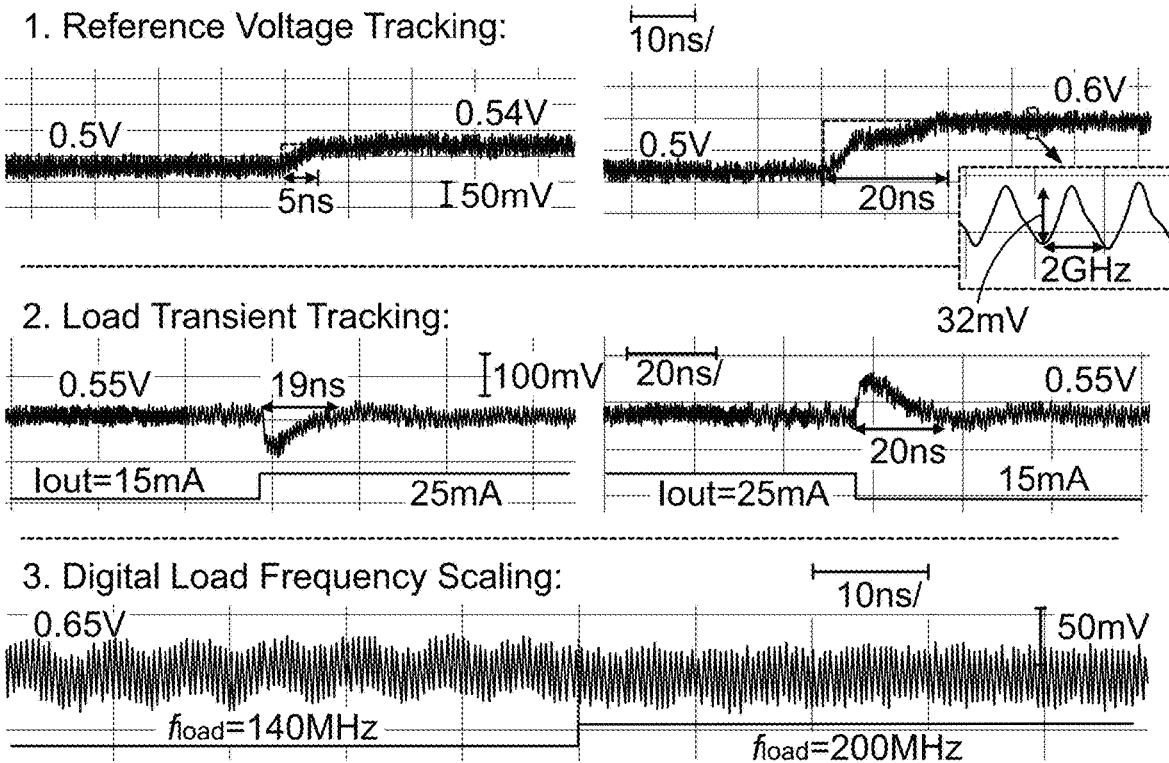
FIG. 8 is a graph of an example regulator output voltage tracking and ripple measurement.
Figure 9:
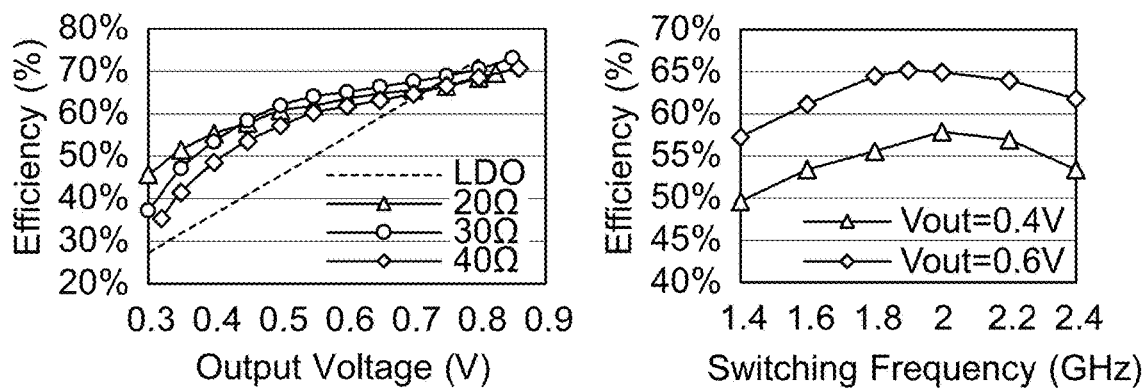
FIG. 9 is a graph of an example regulator efficiency measurement.

FIG. 8 is a graph of an example regulator output voltage tracking and ripple measurement. FIG. 8 shows transient voltage measurement probed at output pin. Under static loading, a 32 mV ripple at 2 GHz is observed. The loop dynamic shows a response speed of 5 ns for small voltage change of 40 mV. Multiple loop clock cycles are needed for settling larger voltage change, e.g. 100 mV. Under instantaneous large load $I_{out}$ transient, an undershoot/overshoot of ~80 mV can be observed which can be mitigated by using larger decoupling capacitors. Digital logics can be activated with a dynamic frequency scaling from 140 MHz to 200 MHz. A slightly larger dynamic ripple of about 50 mV can be observed at digital clock frequency. FIG. 9 shows the measured efficiency. At 0.6V, an efficiency of 65% can be observed. A wide voltage range from 0.3V to 0.86V is achieved with efficiency up to about 73%. An example optimal frequency is observed at about 1.9 G to 2.0 G, matching the simulation example in FIG. 5.

Figure 10:
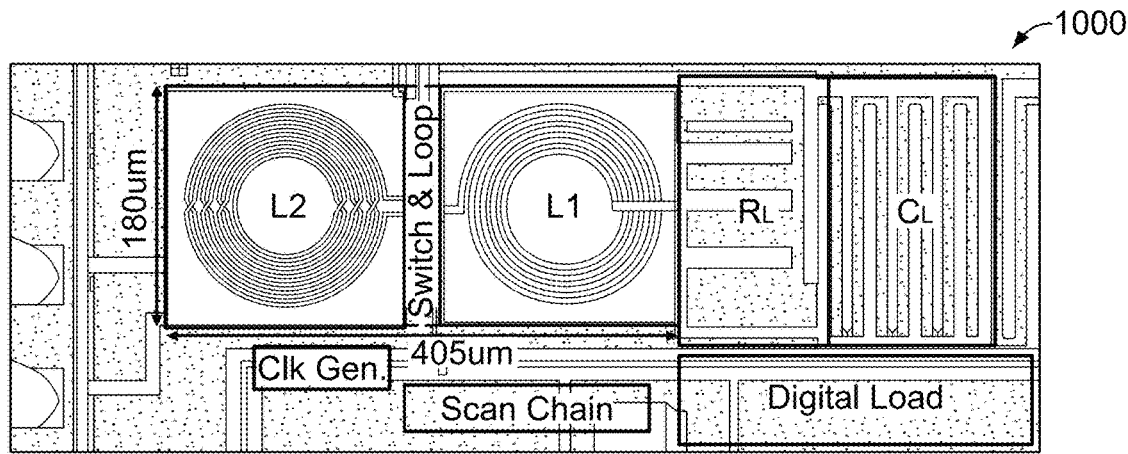
FIG. 10 is a micrograph of an example chip.

FIG. 10 is a micrograph of an example chip 1000. In the example, the overall regulator area is 0.073 mm2, with 91% area occupied by inductors at top metal. Table 1 includes an example performance summary. Compared with previous switched cap (SC) design in 22 nm with similar low power specification, the example can achieve 30% less area, wider output range and similar efficiency performance in a 65 nm process.

Example Performance Summary

| Topology | On-chip Buck Regulator |
|---|---|
| Inductor/Capacitor | on-chip spiral |
| Process (nm) | 65 |
| Fsw (MHz) | 2000 |
| Iout (mA) | 10-40 |
| L (nH) | 3.4 |
| CL (nF) | 0.12 |
| Vin (V) | 1.1 |
| Vout (V) | 0.3-0.86 |
| Ripple (mV) | 32 |
| Response (ns) | 5 |
| Peak Eff. (%) | 73 |
| Eff. at 0.6 V (%) | 65 |
| Area (mm2) | 0.073 |

Figure 11:
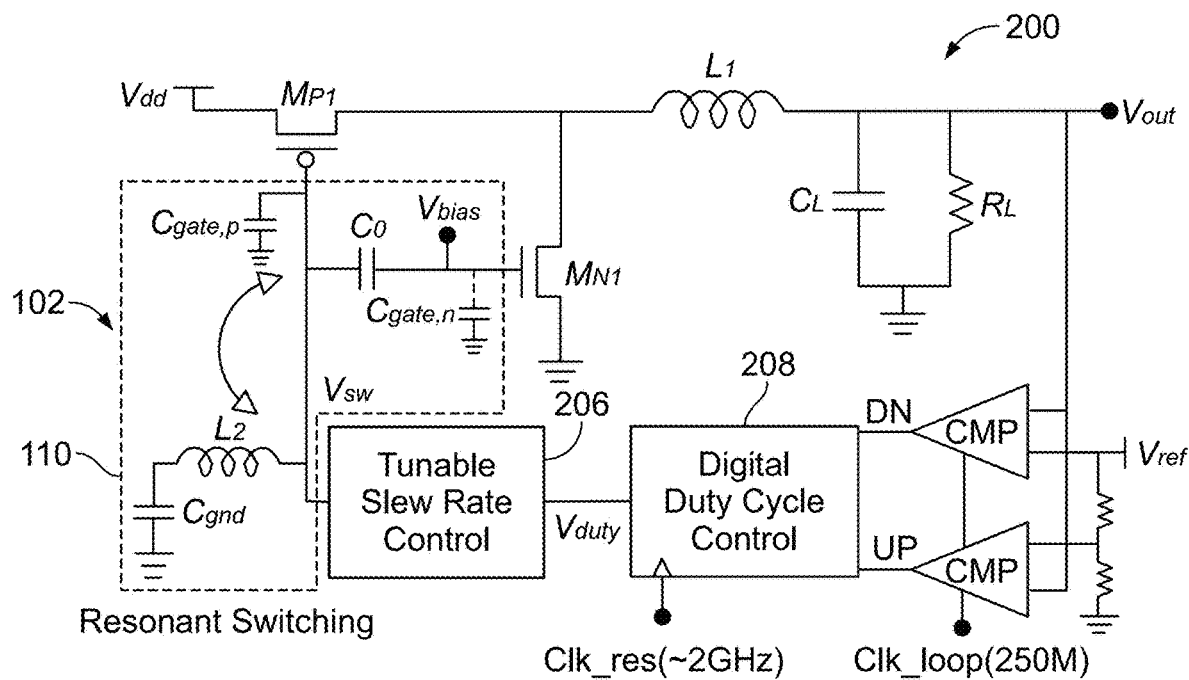
FIG. 11 is a schematic of an example resonant version of the buck regulator.
Figure 12:
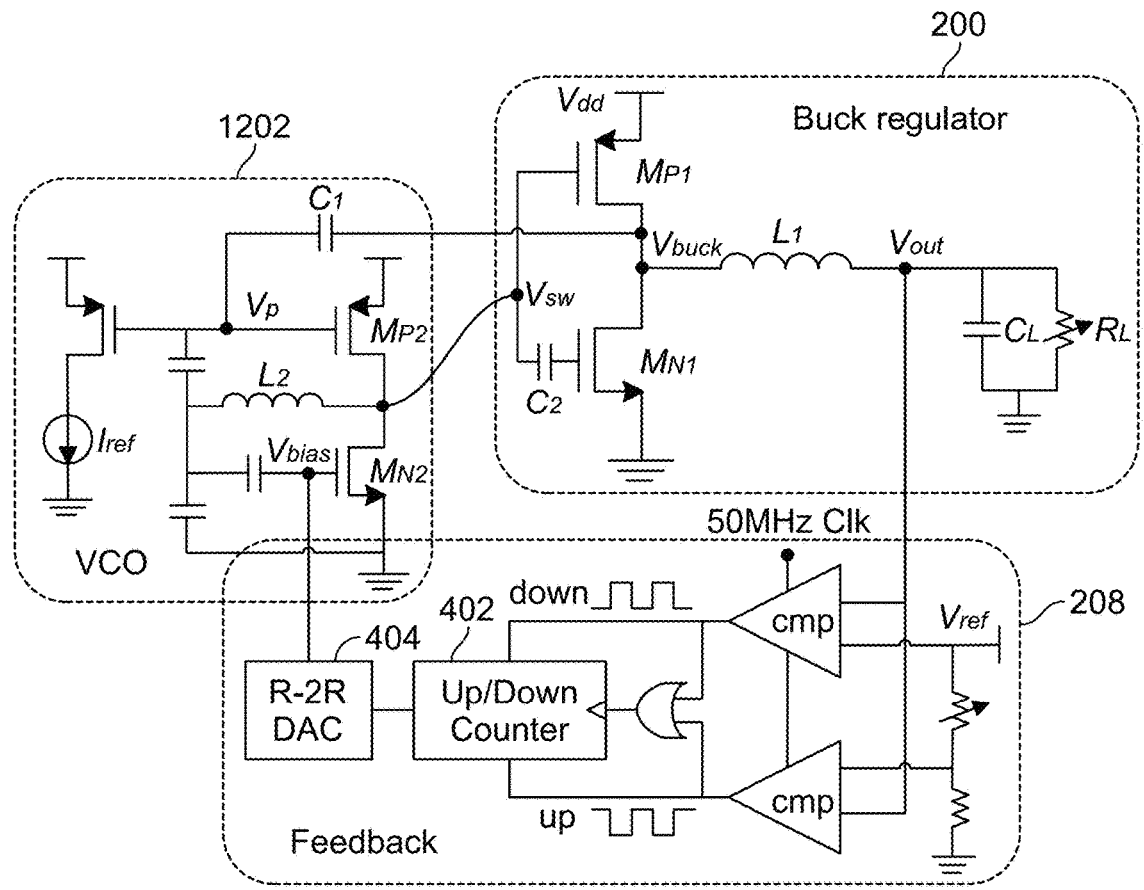
FIG. 12 is a schematic of an example VCO version of the buck regulator.
Figure 13:
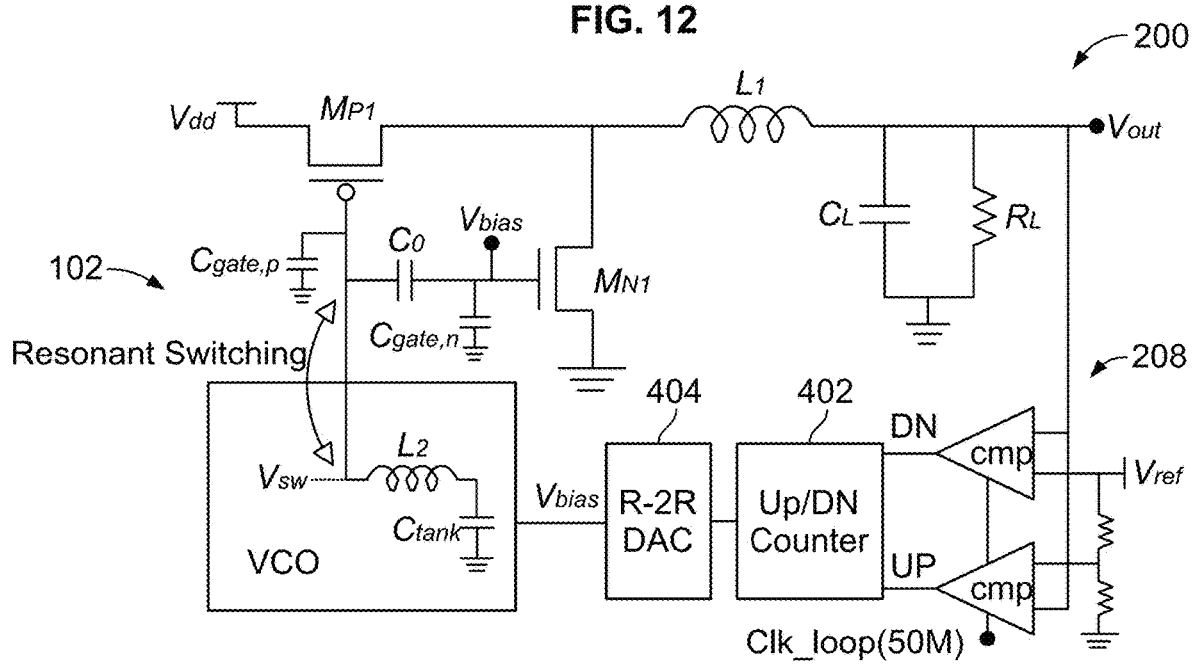
FIG. 13 is a schematic an example VCO version of the buck regulator.

FIG. 11 is a schematic of an example resonant version of the buck regulator 200 with resonant switching circuit 110. FIG. 12 is a schematic of an example voltage-controlled oscillator (VCO) version of the buck regulator 200, including a VCO circuit 1202. FIG. 13 is a schematic an example VCO version of the buck regulator 200 including resonant switching circuit 102. VCO can be integrated with the buck regulator 200 to provide the switch clocking. Resonance is formed between the VCO inductor L2 and gate capacitance of power switches (MN1 and MP1). The resonance stores magnetic energy and reduce the power switch charging loss. The duty cycle control unit circuit 208 feedback loop can include an up/down binary counter 402 and R-2R DAC 404. The comparison results between output voltage and reference voltage generate up (or down) trigger signal and generates higher (or lower) VCO biasing voltage Vbias. With higher biasing voltage Vbias, NMOS switch MN1 is further turned on and decrease the duty cycle of clock Vsw to generate larger output voltage Vout.

Figure 14:
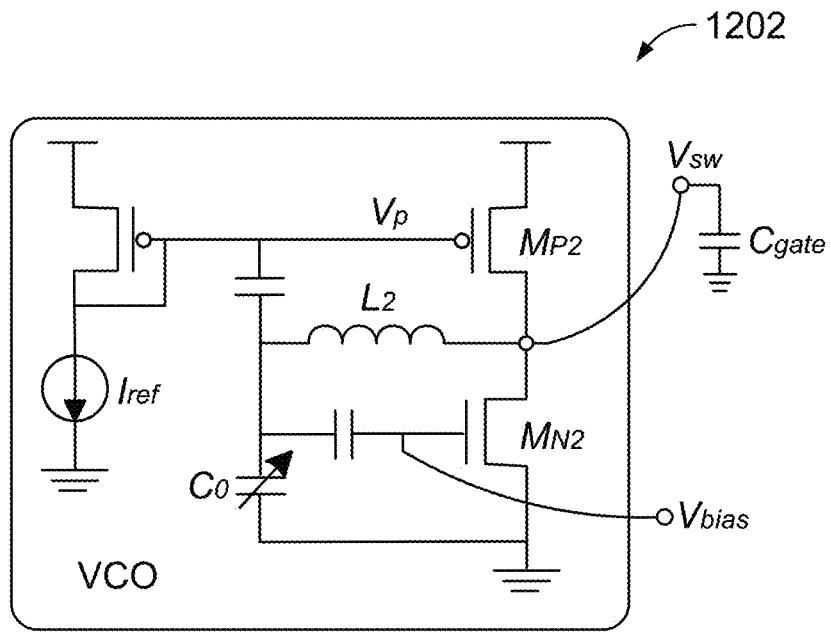
FIG. 14 is a schematic of an example VCO circuit design.
Figure 14:
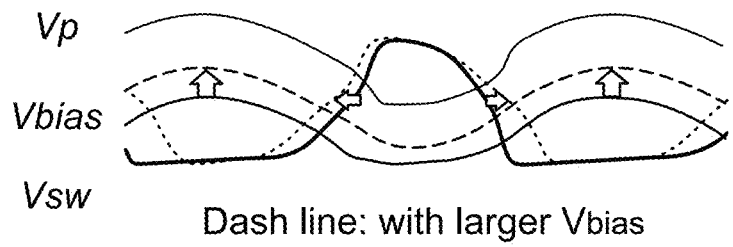
Figure 14:
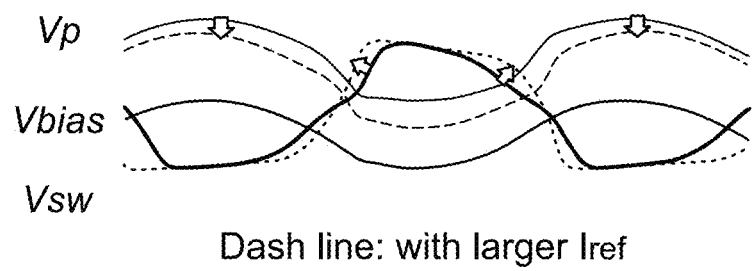

FIG. 14 shows a schematic of an example VCO circuit 1202 design. Inductor L2 and capacitor C0, power switch gate capacitance Cgate form the frequency resonance, in which C0 is tunable capacitor array to adjust the resonant frequency. The transistor MP2 and MN2 drive the buck regulator power switch MP1 and MN1 at node Vsw. The duty cycle and the slew rate of Vsw is tunable. In the waveform, with larger biasing voltage Vbias, the gate voltage of MN2 is raised, and the duty cycle of Vsw is increased. This leads to the increasing of the output voltage Vout. The reference current Iref could also adjust slew rate of Vsw. With larger Iref, the voltage of Vp is dropped and bring better slew rate of Vsw.

Figure 15:
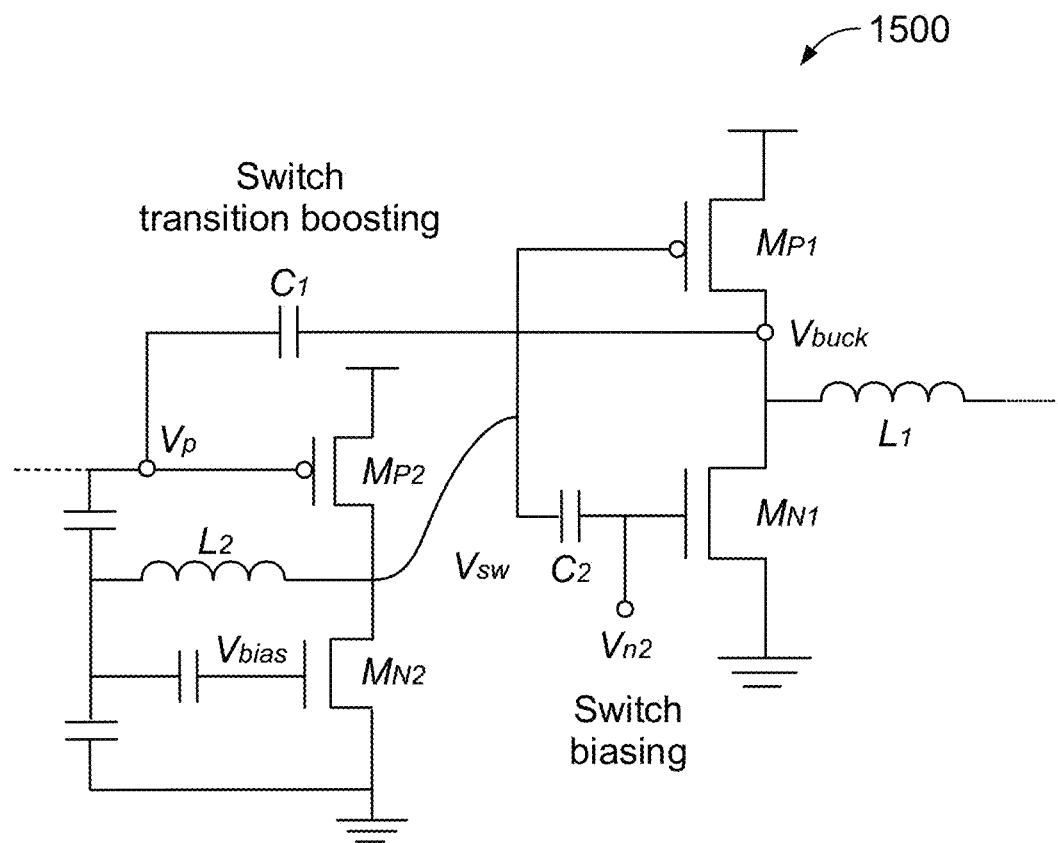
FIG. 15 is a schematic of an example switch transition boosting circuit to improve efficiency.
Figure 15:
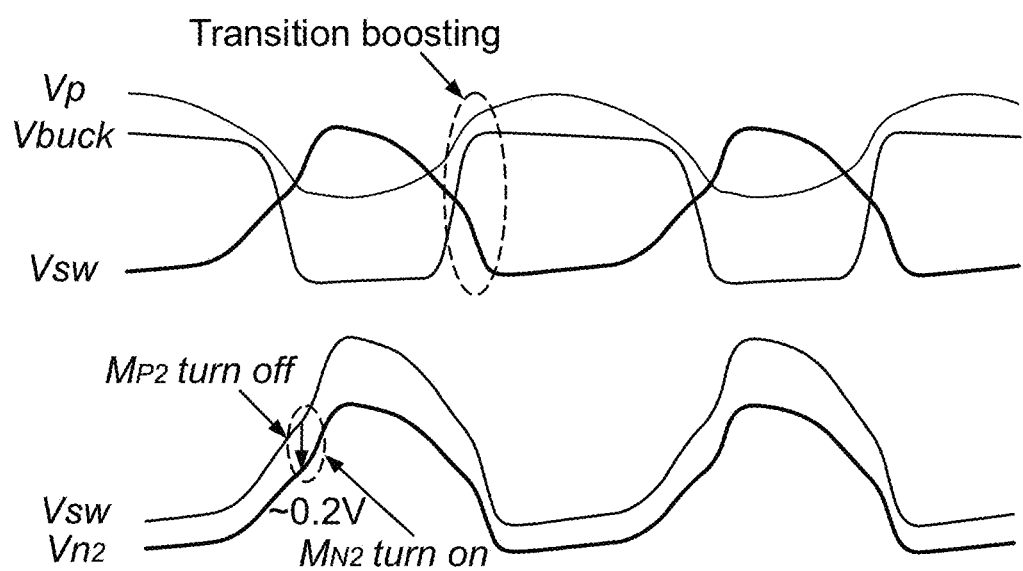

FIG. 15 is a schematic of an example switch transition boosting circuit 1500 to improve efficiency. One possible advantage of buck regulator design is the power delivery efficiency. For buck regulators with high switching frequency, the most energy delivery loss comes from the power switches MP1 and MN1 as the high frequency switching. To improve the power efficiency performance, two example design methods are described. First, to reduce the energy loss at MP1, capacitor C1 is introduced to couple the square wave Vbuck to node Vp and boost the switch transition at node Vp. As a result, the slew rate of Vsw is improved. Therefore, the switching process of MP1 becomes shorter and cost less energy. Second, to reduce the energy loss at MN1, capacitor C2 is inserted before MN1 gate to shift down Vsw by around 0.2V to Vn2. In that case the switch processes of MP1 and MN1 are separated and reduce switching energy loss.

Low power applications, e.g., wearable electronics, Internet-of-Things, etc., can provide new demands on low power management schemes. As discussed above, the buck regulator 200, e.g., DC-DC power converters, can be fully integrated on chip. The voltage tuning range of buck regulator can be limited by its buck inductance and the deviation of inductor current frequency, as follows:

$$\frac{I_{out}}{V_{in} \overset{L}{\sim} V_{out}} \qquad I_{out} \propto \frac{\alpha}{f_{sw} \cdot L}$$

where $I_{out}$ is less than 50 mA. As large buck inductance can be too costly on chip, low switching frequency at tens of megahertz with a small buck inductor can be applied on chip to maintain enough voltage conversion range. If the buck regulator switching frequency is pushed too high, power delivery efficiency can be compromised as the switching loss can become significant. For example, the regulator peak efficiency drops when the switching frequency is pushed to 500 MHz. A low power buck regulator design is even harder as it requires larger inductance or higher switching frequency to keep same tuning range. Ten times larger inductance can be required if the target load current is changed from 400 mA to 40 mA with same switching frequency.

Figure 16:
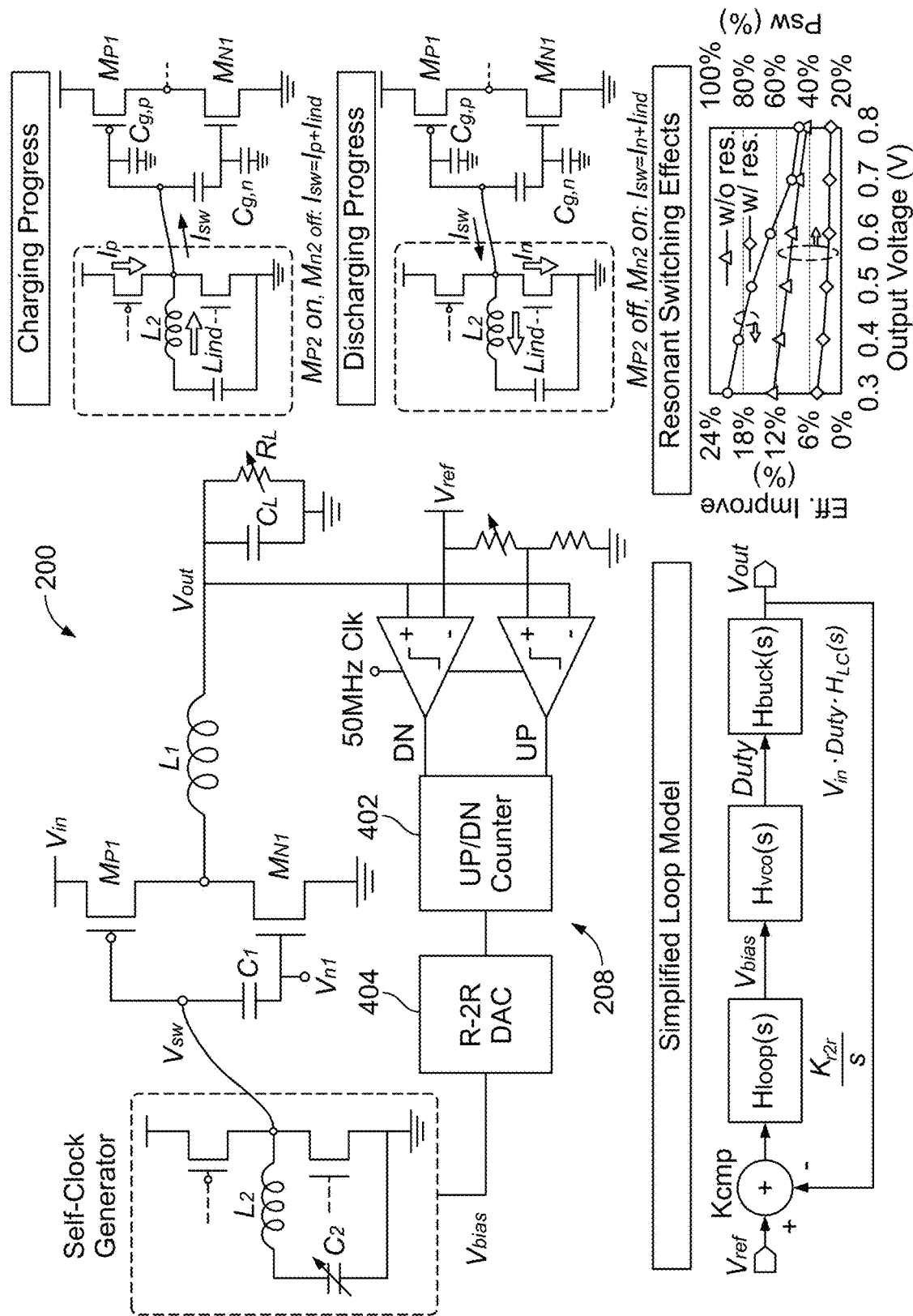
FIG. 16 is schematics of an example resonant buck regulator.

FIG. 16 is an overall schematic of an example resonant buck regulator 200. In one example, a buck regulator targets low power application for output power, e.g., 10~30 mW. To utilize a small value on-chip inductor, the switching frequency can be pushed to about 2 GHz. As mentioned above, high frequency switching loss dominates and efficiency drops. To improve the regulator efficiency, a resonant switching scheme can be applied to save the clock charging and discharging energy at high frequency. When resonant clocking is utilized for the buck regulator, it shows the clock energy consumption is reduced around 45% in average compared with the conventional clocking, as in FIG. 17, and equally improve the buck regulator efficiency by about 20% for example.

Figure 17:
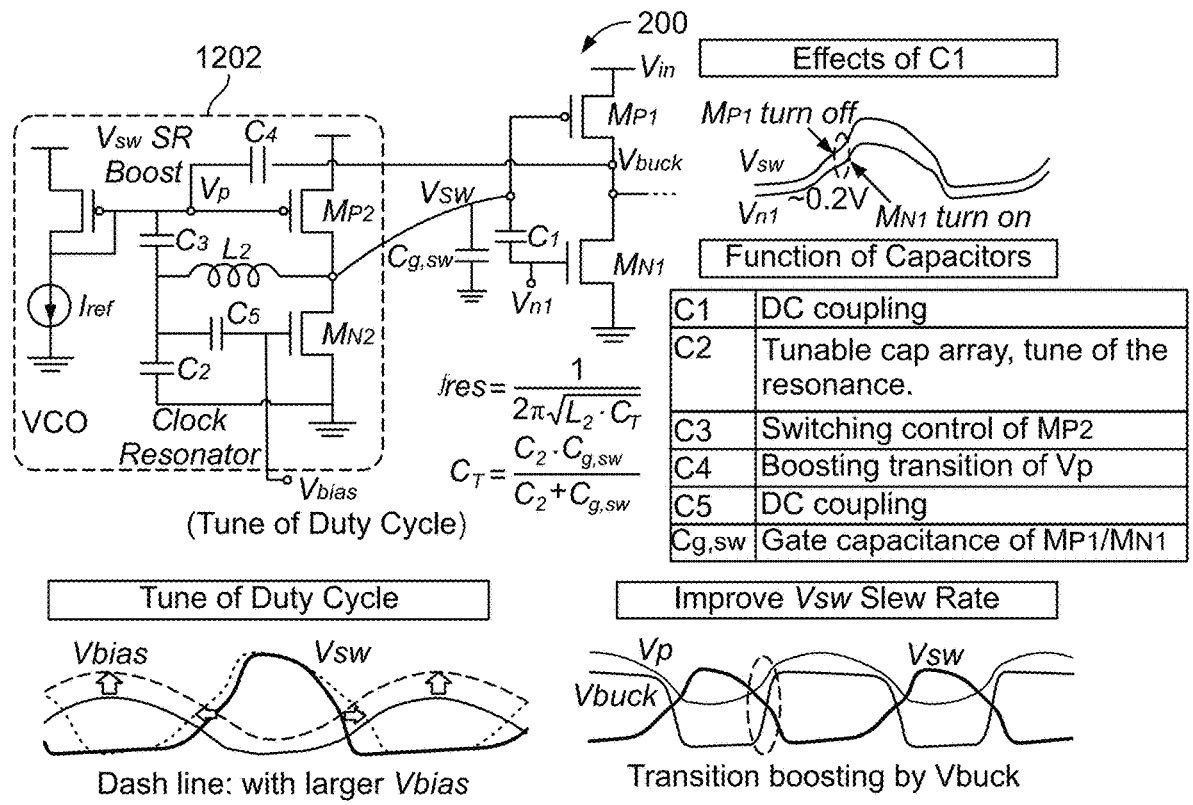
FIG. 17 is a circuit and graphs of example regulator efficiency improvement approaches and inductor mutual coupling simulation.

FIG. 17 shows the overall schematic of the resonant buck regulator 200 with an integrated VCO to provide the switch clocking. Resonant is formed by the VCO inductor L2 and buck switch gate capacitance, which stores magnetic energy and reduce the switch charging loss. In some examples, the VCO inductance L2 and buck inductance L1 can include about 11.6 nH and 3.5 nH, respectively. The comparison results between output voltage and reference generate up (or down) trigger signal and generates higher (or lower) VCO biasing voltage Vbias. With higher biasing voltage, NMOS MN2 can be further turned on and decrease the duty cycle of clock Vsw to generate larger output voltage Vout. Most energy delivery loss comes from the buck switches MP1 and MN1 as the high frequency switching. In order to reduce the energy loss at MP1, capacitor C4 is introduced to couple the square wave Vbuck to boost the switch transition at node Vp. As the results, the switch process of MP1 becomes shorter and cost less energy. For energy loss at MN1, coupling capacitor C1 is added before MN1 gate to shift down Vsw by around 0.2V to Vn1. In that case the switch processes of MP1 and MN1 are intended separated and reduce switching energy loss.

Figure 18:
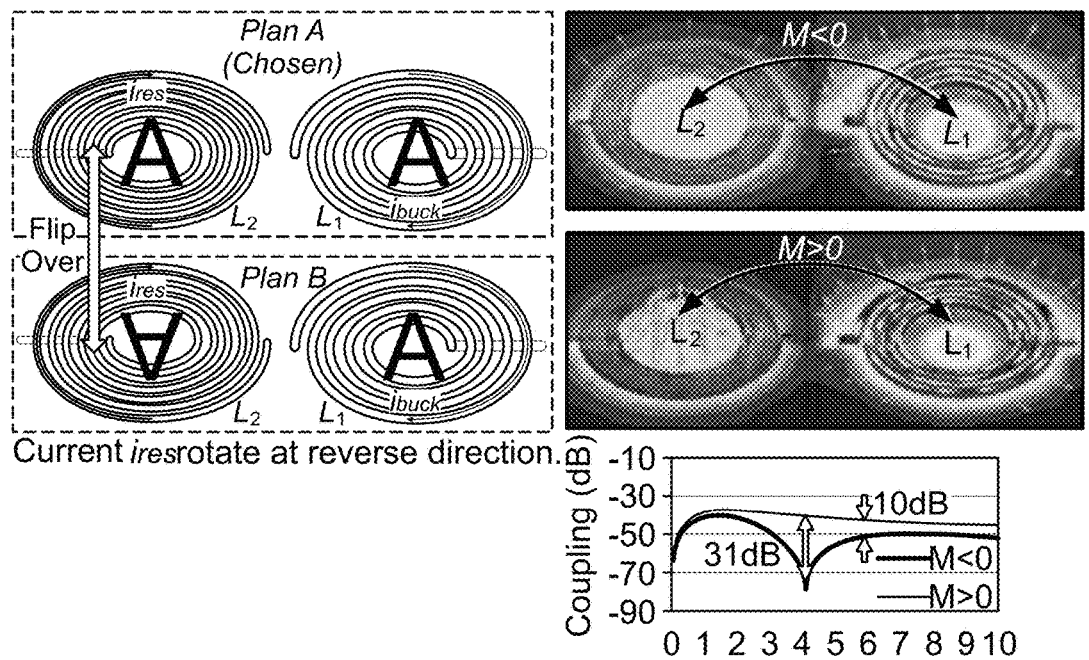
FIG. 18 is a schematic of an example inductor floorplan.

FIG. 18 is a schematic of an example inductor floorplan. As two inductors (resonant inductor L2 and buck inductor L1) are included, the inductor mutual coupling can be determined by electromagnetic (EM) simulation, in FIG. 18, where the effective inductance is:

$$L_{eff,1} = L_1 + M\frac{\partial i_{clk}/\partial t}{\partial i_{out}/\partial t} \approx L_1$$

$$L_{eff,2} = L_2 + M\frac{\partial i_{out}/\partial t}{\partial i_{clk}/\partial t}$$

$$i_{out} \gg i_{clk},$$

with 180° phase difference

FIG. 19 is a chart comparing example fully integrated converter solutions. In some examples, with higher switching frequency, the described integrated buck regulator can achieve comparable efficiency performance at 0.6V. The overall area can include only 0.079 mm2.

While various embodiments have been described, it can be apparent that many more embodiments and implementations are possible. Accordingly, the embodiments are not to be restricted.

We claim:

1. A system, comprising:
a buck regulator circuit including a first switch, a second switch, and a load current; and
a resonant tank circuit connected to an input of both the first switch and the second switch of the buck regulator circuit, wherein the resonant tank circuit comprises an inductor, a first capacitor and a second capacitor configured to form the resonant tank circuit to jointly switch both the first switch and the second switch of the buck regulator to reduce a switching power from a switching frequency of the first switch and the second switch, wherein the inductor resonates with a first gate capacitance of the first capacitor and a second gate capacitance of the second capacitor, wherein the switching frequency is at least 2 GHz when the load current is in a range of 10 mA to 40 mA.

2. The system of claim 1, where the first switch comprises an NMOS switch and the second switch comprises a PMOS switch.

3. The system of claim 1, further comprising a slew rate recovery circuit connected with the buck regulator circuit.

4. The system of claim 3, where the slew rate recovery circuit comprises separately adjusted timing of clock drivers with voltages through tunable capacitors.

5. The system of claim 1, further comprising a digital duty cycle control circuit connected with the buck regulator circuit.

6. The system of claim 5, where the digital duty cycle control circuit provides feedback control for voltage regulation to the buck regulator circuit.

7. The system of claim 1, where the first capacitor connects with the second switch to boost switch transition and reduce energy loss.

8. The system of claim 1, where the second capacitor connects with a gate of the first switch to shift down a voltage.

9. The system of claim 1, wherein the resonant tank is housed in at least one of a mobile phone, a smart device, a wearable device, an Internet-of-Things device, a remote sensor and a biomedical device.

10. The system of claim 1, further comprising a feedback loop for generating control voltages to the buck regulator circuit.

11. The system of claim 1, further comprising a slew rate recovery circuits to improve switching transition speed to reduce power loss.

12. A system, comprising:
a buck regulator circuit including a first switch, a second switch, and a load current; and
a digital duty cycle control circuit connected with the buck regulator circuit, where the digital duty cycle control circuit provides feedback control to the buck regulator circuit for voltage regulation; and
a resonant tank circuit connected to an input of the buck regulator circuit, where the resonant tank circuit comprises an inductor, a first capacitor and a second capacitor to jointly switch both the first switch and the second switch of the buck regulator to reduce a switching power from a switching frequency of the first switch and the second switch, wherein the inductor resonates with a first gate capacitance of the first capacitor and a second gate capacitance of the second capacitor, wherein the switching frequency is at least 2 GHz when the load current is in a range of 10 mA to 40 mA.

13. The system of claim 12, where the duty cycle control circuit comprises an up/down binary counter and a digital-to-analog converter.

14. The system of claim 13, where the digital-to-analog converter comprises an R-2R digital-to-analog converter.

15. The system of claim 12, further duty cycle control circuit generates control voltages to the buck regulator circuit.

16. The system of claim 12, further comprising a slew rate recovery circuit connected with the duty cycle control circuit and the buck regulator circuit, where the slew rate recovery circuit comprises separately adjusted timing of clock drivers with voltages through tunable capacitors.

* * * * *